United States Patent

Ramcke et al.

[11] Patent Number: 5,246,049
[45] Date of Patent: Sep. 21, 1993

[54] PNEUMATIC VEHICLE TIRE WITH WAVE-SHAPED CIRCUMFERENTIAL GROOVES

[75] Inventors: Uwe Ramcke, Walsrode; Hagen Trabandt, Sehnde, both of Fed. Rep. of Germany

[73] Assignee: Continental Aktiengesellschaft, Hanover, Fed. Rep. of Germany

[21] Appl. No.: 850,412

[22] Filed: Mar. 12, 1992

[30] Foreign Application Priority Data

Mar. 12, 1991 [DE] Fed. Rep. of Germany ....... 4107916

[51] Int. Cl.[5] ............................................. B60C 11/06
[52] U.S. Cl. ........................... 152/209 R; 152/DIG. 1
[58] Field of Search .......... 152/209 R, 209 D, 209 A, 152/DIG. 1

[56] References Cited

U.S. PATENT DOCUMENTS

| | | | |
|---|---|---|---|
| 2,779,378 | 1/1957 | Robertson | 152/209 R |
| 4,630,661 | 12/1986 | Stelzer | 152/209 R |
| 4,854,358 | 8/1989 | Takeuchi | 152/209 R |
| 5,099,899 | 3/1992 | Takeuchi | 152/209 R |

FOREIGN PATENT DOCUMENTS

| | | | |
|---|---|---|---|
| 0351349 | 1/1990 | European Pat. Off. | 152/209 R |
| 0197409 | 10/1985 | Japan | 152/209 D |
| 0178205 | 8/1986 | Japan | 152/209 R |
| 0053609 | 2/1990 | Japan | 152/209 D |
| 2155808 | 6/1990 | Japan | 152/209 R |

Primary Examiner—Michael W. Ball
Assistant Examiner—Nancy T. Krawczyk
Attorney, Agent, or Firm—Robert W. Becker & Associates

[57] ABSTRACT

A pneumatic vehicle tire which is especially suitable for non-driven axles of commercial vehicles is provided with wave-shaped circumferential grooves. The wave amplitude at the bottom of the groove is greater than at the tread periphery. This is achieved by periodically twisting the circumferential groove in the circumferential direction. The wave amplitude at the tread periphery may equal zero. In order to reduce the tendency to retain stones, it is suggested that the circumferential grooves in their center sections are provided with a transverse portion relative to the circumferential direction while in the extreme section further portions extend at a small acute angle relative to the circumferential direction.

19 Claims, 8 Drawing Sheets

PNEUMATIC VEHICLE TIRE WITH WAVE-SHAPED CIRCUMFERENTIAL GROOVES

BACKGROUND OF THE INVENTION

The present invention relates to a pneumatic vehicle tire, especially for commercial vehicles, with circumferential wave-shaped grooves whereby the amplitude of the waveshape at the bottom of the groove is substantially greater than at the periphery of the tread and whereby the increase of the amplitude with increasing tread depth is continuous. Such a pneumatic vehicle tire is known from U.S. Pat. No. 3,055,410. This embodiment of the prior art is designed to prevent so-called retention of stones in the grooves.

In this context, "retention of stones" refers to the property of treaded vehicle tires to retain stones in the grooves. This property is detrimental to the performance of the tire, because, when of a considerable size, such retained stones may damage the bottom of the grooves. With pneumatic vehicle tires, with which the present invention is concerned, such retained stones may penetrate the tire tread and reach the reinforcement belt layers. By doing so, a capillary is formed through which moisture may come into contact with the steel wire cord and corrode the reinforcement belt layers. This not only results in a reduction of the wire stiffness, but also especially in a reduction of the adhesion of the polymer or rubber to the metal. Furthermore, retained stones may be ejected like a projectile from the tread surface when the tire is rotated at high enough speeds. The retained stones also cause an untrue run of the tires.

Although this prior art patent provides a certain reduction of the detrimental retention of stones, a large number of stones is still retained.

From Austrian patent 325971 as well as from German Offenlegungschrift 21 57 814 a tire tread with meander-like wound longitudinal grooves is known in which a center section arranged between the meander extremes is essentially extending in an axial direction. This arrangement extends continuously from the bottom of the groove to the periphery of the tread, where it improves the transmission of longitudinal forces within the tread periphery (braking, acceleration). However, both treads which are designed for mud and snow tires do not reduce the retention of stones.

The problem of retention of stones is greater for commercial vehicle tires than for tires for passenger cars or motorcycles because the required service life or mileage is substantially greater for commercial vehicle tires. At the same time, the tire diameter is greater while the maximum speed that is commonly reached is lower. Accordingly, the maximum centrifugal force, which acts on the stones that have penetrated the tire tread and which may cause the ejection of the stones, is substantially smaller for commercial tires than for passenger car or motorcycle tires. Furthermore, the problem of retention of stones is worsened by respective operational conditions where the tires are in contact with a plurality of stones. Thus, this problem is especially prevalent for trailer tires of construction vehicles.

Furthermore, the problem of stone retention is especially pronounced for a tire embodiments according to European patent 0 173 101 because the tires according to this document exhibit a very high service life due to a reduction of the rolling resistance resulting from the temperature reduction accomplished within the tire tread.

It is therefore an object of the present invention to provide a tire tread for a pneumatic vehicle tire with which the retention of stones may be reduced.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The pneumatic vehicle tire of the present invention is primarily characterized by waveshaped circumferential grooves with a right and a left groove side wall and a bottom, the grooves having right and left extremes relative to a circumferential direction of the grooves, each of the circumferential grooves having a groove center lined defined equidistantly between the right and the left groove side walls at any portion of a radial height of the grooves; a central reference line extending in a circumferential direction of the grooves, with an amplitude of the groove center line being measured from the central reference line at a respective portion of the radial height, the amplitude of the groove center line being greater at the bottom of the grooves than at a periphery of tread, with the amplitude increasing continuously from the periphery of the tread to the bottom of the groove; the grooves being divided into three axially adjacent sections, a left extreme section, a center section that is symmetrically arranged relative to the central reference line, and a right extreme section, with the groove center line passing in a periodically repeated sequence from the left extreme section through the center section to the right extreme section, and from there back through the center section to the left extreme section and so on; and the groove center line in the center section having an essentially transverse portion relative to the circumferential direction and in the left and the right extreme sections having further portions extending at a small acute angle relative to the circumferential direction.

In the context of the present invention the "small acute angles" refer to angles smaller than 40°, and "essentially transverse portions" refer to a portion of the groove center line having an angle of at least 60° relative to the circumferential direction.

Preferably, the transverse portion, at the bottom of the groove, encloses an angle of 75° to 105° with the further portions of the left and right extreme sections. Furthermore, at the bottom of the groove, the transverse portion should from an angle of greater than 60° with the circumferential direction; preferably, the angle is between 60° and 70°.

It has been determined in experiments that transverse groove, i.e., essentially axially extending grooves, have the tendency to retain stones to an even greater extent than longitudinal grooves. Surprisingly, it has been found with the present invention that for the reduction of the retention of stones transverse portions, which extend essentially in an axial direction, should be integrated in the longitudinal grooves.

With a circumferential groove according to U.S. Pat. No. 3,055,410 which twists continuously from the left extreme to the right extreme, the waveshape of the bottom of the groove is comprised of a central section in which the groove cross-section is symmetrical. In a plurality of experiments, it has been demonstrated by the the present inventors that this center section is the preferred location in which stones are retained. Based on this knowledge the inventive solution was developed which teaches the elimination of the central section in the prior art.

Furthermore, the applicants have taken into consideration the fact that with straight longitudinal grooves having a symmetric cross-section the tendency to retain stones is reduced when the angle of the groove side walls in the cross-sectional plane is increased. This angle is measured relative to the normal of the tire tread surface. The selection of a great angle of the groove side walls, resulting in a wide opening of the groove, is however disadvantageous because the tread volume is rapidly reduced as the tire wears off. Accordingly, the hydroplaning characteristics of the tire would be rapidly reduced with increasing mileage.

Based on these two conflicting facts, the inventors have found the solution of considering the angle of the left and right groove side walls separately. It could be demonstrated that not average median value of both angles determines the amount of stone retention, but the maximum value of both angles. Accordingly, for a given groove width at the periphery of the tire tread and a further given smaller groove width at the bottom of the groove, a reduction of the retention of stones could be accomplished by selecting one of the angles to be zero and selecting the other to be respectively greater. However, the asymmetry which is generated in this fashion also results in an asymmetric micro working movement at the tire tread surface and thus to a certain drift angle. This is undesirable with respect to the rolling resistance and the service life or mileage of the tire.

This may be compensated by varying the asymmetry over the circumference of the tire tread. This compensation, for the well-known parallel extension of the longitudinal grooves, may only be achieved when the greatest wavelength of the longitudinal groove is at most 1/5 of the length of the surface contact area. In order to prevent the tire tread from becoming too fine, the greatest wavelength of the longitudinal groove should be at least 1/9 of the length of the surface contact area.

According to the present invention the continuous switching between the left and the right extremes, as known from the prior art, is abandoned and instead a location of discontinuity is provided in the form of a transverse portions within the central section between the left and right extreme sections of the longitudinal groove, the central section having been identified as the location where the retention of stones occurs. In cooperation with the winding or twisting of the groove side walls, stones that penetrate the tire tread will find only a reduced support in these areas.

For a more exact description of the waveshape, especially at the bottom of the groove, it is expedient to define a groove center line for each longitudinal groove that is positioned equidistantly between the right and the left groove side walls at any portion of the radial height of the grooves. By introducing this groove center line, it is easily possible to differentiate between the groove width which depends on the height of the groove and the amplitude of the waveshape which is also dependent on the height of the groove.

The term amplitude in this context is used in analogy to the terminology used in oscillation theory. In order to be able to exactly measure the amplitude it is first necessary to define a reference line. As a function of the respectively considered groove height (radial height) the reference line is defined as a line which extends exactly in the circumferential direction and which is arranged at the center between the extremes of the groove center line. The respective deflection is thus the distance between the groove center line and the central reference line, and the amplitude is the distance between a respective extreme and the central reference line.

When following the groove center line in a randomly selected direction in the inventive embodiment of the tire tread the groove center line passes through different axially adjacent sections, these sections being a left extreme section, a center section, which is symmetrically arranged about the central reference line, and a right extreme section, and from there back through the center section to the left extreme section, and so on. When passing the center section, the groove center line has an essentially transverse portion relative to the circumferential direction. In the left and right extreme sections the groove center line has further portions extending at a small acute angle relative to the circumferential direction.

The term "center section" of the groove center line in this context is used such that the left border of the center section is identical to the left end of the transverse portion and the right end of the center section is identical to the right border of the transverse portion. The transverse portion thus extends over the entire axial length of the center section. Based on the above definitions, respective dimensions for the circumferential groove may be provided. Preferably, the axial extension of the center section relative to the central reference line corresponds to at least 0.2 to at most 0.4 times a value of the amplitude of the groove center line at the bottom of the groove, whereby the center section is symmetrical relative to the central reference line.

In a preferred embodiment of the present invention, the transverse portion at the bottom of the groove encloses an angle between 75° and 105° with the further portions of the groove center line extending at a small acute angle relative to the circumferential direction within the extreme sections. Preferably, in such an embodiment the transverse portion is oppositely oriented with respect to the circumferential direction relative to the further portions in the left and the right extreme sections. When following the groove center line at the bottom of the groove in a randomly selected direction, the orientation of the groove center line changes with respect to an inertial frame of the tire tread surface. These orientations may be divided into an axial component and a component in the circumferential direction. With respect to the aforementioned arrangement, only the component in the circumferential direction is considered. Accordingly, when switching from one extreme section into the central section and vice versa the sign of the circumferential component must change.

As explained above, a sufficient compensation of the drift tendency due to an asymmetric groove cross-section, despite a parallel arrangement of all of the circumferential grooves, is possible. Parallel circumferential grooves have the advantage that the distance between the grooves may be selected to be small. In order to accomplish a sufficient transverse stiffness of the essentially circumferentially extending ribs, this groove distance, measured between the central reference lines of the longitudinal grooves, may be 2.2 times the radial height of the groove. It is expedient that the neighboring grooves are spaced from one another at most 2.6 times the radial height of the grooves. With the present invention there is no further restriction with respect to the number of grooves. Especially, it is possible to provide an uneven number of grooves, for example, 5.

For an even number of circumferential grooves, a complete compensation of the alternating drifting tendency is possible when the wave-shaped circumferential grooves are paired such that the circumferential grooves of one groove pair are arranged with respect to an axis of symmetry extending in the circumferential direction such that at any selected location in the circumferential direction each one of the left extremes of the first one of the grooves of the respective pair corresponds to a respective one of the right extremes of the second groove of the pair. The two circumferential grooves of such a pair need not be adjacent.

Where neighboring circumferential grooves are symmetric with respect to an axis of symmetry, the distance between the grooves, measured from central reference line to central reference line, should be at least 2.6 times the radial height of the groove in order to provide sufficient transverse stiffness to the ribs. When it is desired to provide a high number of circumferential grooves, with respect to the width of the tread surface, with a complete compensation of the drifting tendency, it is expedient that the two grooves adjacent to the radial center plane of the tire are symmetrically arranged (as described above) with respect to an axis of symmetry extending in the circumferential direction. Furthermore, neighboring ones of the grooves extending from the radial center plane to shoulders of the tread should have an axial distance between respective one of the reference lines of at least 2.2 times the height of the grooves, the neighboring grooves being parallel to one another, and with the axial distance between the two grooves adjacent to the radial center plane being greater than the axial distance between the neighboring grooves. With this arrangement, the widest rib is located at the center of the tire tread where the smallest flow cross-sections for the removal of water are required.

With such a complete drift compensation a substantially greater wavelength of the circumferential grooves may be possible than with a parallel orientation of all circumferential grooves. Preferably, the greatest wavelength of the grooves adjacent to the radial center plane is at most ⅓ and at least 1/7 of a length of a surface contact area of the tire under normal load. The normal load conditions are comprised of the load rating of the tire, the air pressure rating, and meterological normal conditions (760 mm Hg, 20° C.).

When all of the grooves are arranged parallel to one another the greatest wavelength of the parallel grooves is at most 1/5 and at least 1/9 of the length of the surface contact area of the tire under normal load.

It is expedient that the amplitude at the bottom of the groove is at least 40% of the width of the groove at the periphery of the tire tread. The amplitude at the periphery of the tire tread should be at most 10% of the width of the grooves at the periphery of the tread, when a mileage rating is desired. This results in a great wear uniformness and cupped tread element surfaces are prevented.

In a preferred embodiment of the present invention, the bottom of the groove has a recess having a radial height between 1.5 to 2.2 mm and an axial width between 2 and 3 mm.

Preferably, the amplitude of the wave-shaped groove center line at the bottom of the groove is at least 4 times the width at the periphery of the tire tread. This ensures a sufficient prevention of retention of stones. Under extremely difficult operational conditions (trailers of construction vehicles), the amplitude of the groove center line at the bottom of the groove should be least 46% of the groove width at the periphery of the tire tread.

Directional tires are unsuited for commercial vehicles. In order to provide a unidirectional tire, it is necessary that at least the entire tread pattern be radially symmetric with respect to a point of symmetry at the tread center. To determine symmetry, the tread surface is projected in a developed projection, whereby the possible varying circumferential extension of the pitch is ignored. Furthermore it is known, to increase the radial symmetry by providing each individual circumferential groove with a point of symmetry at its respective central reference line.

In a preferred embodiment the tire tread has a pitch sequence with a uniform pitch length, and a developed projection of the grooves at any portion of the height exhibits radial symmetry, with points of symmetry being positioned on the central reference line and on the transverse portion.

In another preferred embodiment the tire tread is comprised of 60 to 110 pitches of varying circumferential length forming a pitch sequence. The pitches are formed of a single pattern or of two alternating patterns with axial dimensions of the pitches being invariant and circumferential dimensions being varied according to the pitch sequence. A developed projection of the grooves at any portion of the height exhibits radial symmetry with points of symmetry being positioned on the central reference line and on the transverse portion.

With the above special embodiments of the present invention the essentially known embodiment of the individual circumferential grooves having radial symmetry in a plan view is combined with the inventive features.

A further reduction of the tendency to retain stones is accomplished by providing the bottom of the groove with a recess having a radial height between 1.5 and 2.2 mm and an axial width between 2.0 and 3.0 mm. At the radially outer end of the recess the side walls of the groove are steeper than at the radially outer portions of the groove cross-section; preferably, they are vertical. For a given maximum groove width at the radial outermost position and a given minimum groove width at the radial innermost position, the preferred inventive embodiment with a recess allows to provide the groove side walls with flatter angles within the radially outer portions. However, the problem of stone retention is especially great within the radially outer portions. In a specific embodiment discussed infra, the transition between the recess and the radially outwardly oriented cross-section of the circumferential groove is in the form of a sharp bend. However, this is not a requirement: It is also possible to provide an intermediate portion between the radially inwardly oriented recess and the radially outwardly oriented cross-section in which the angle of the groove side walls is a value selected between the angle of the radially outwardly and radially inwardly oriented portions. The two bends which are created in this fashion increase the stone removal effect somewhat and also reduce the respective bending angle.

DESCRIPTION OF PREFERRED EMBODIMENTS

The present invention will now be described in detail with the aid of several specific embodiments utilizing FIGS. 1 through 8.

Figure 1:
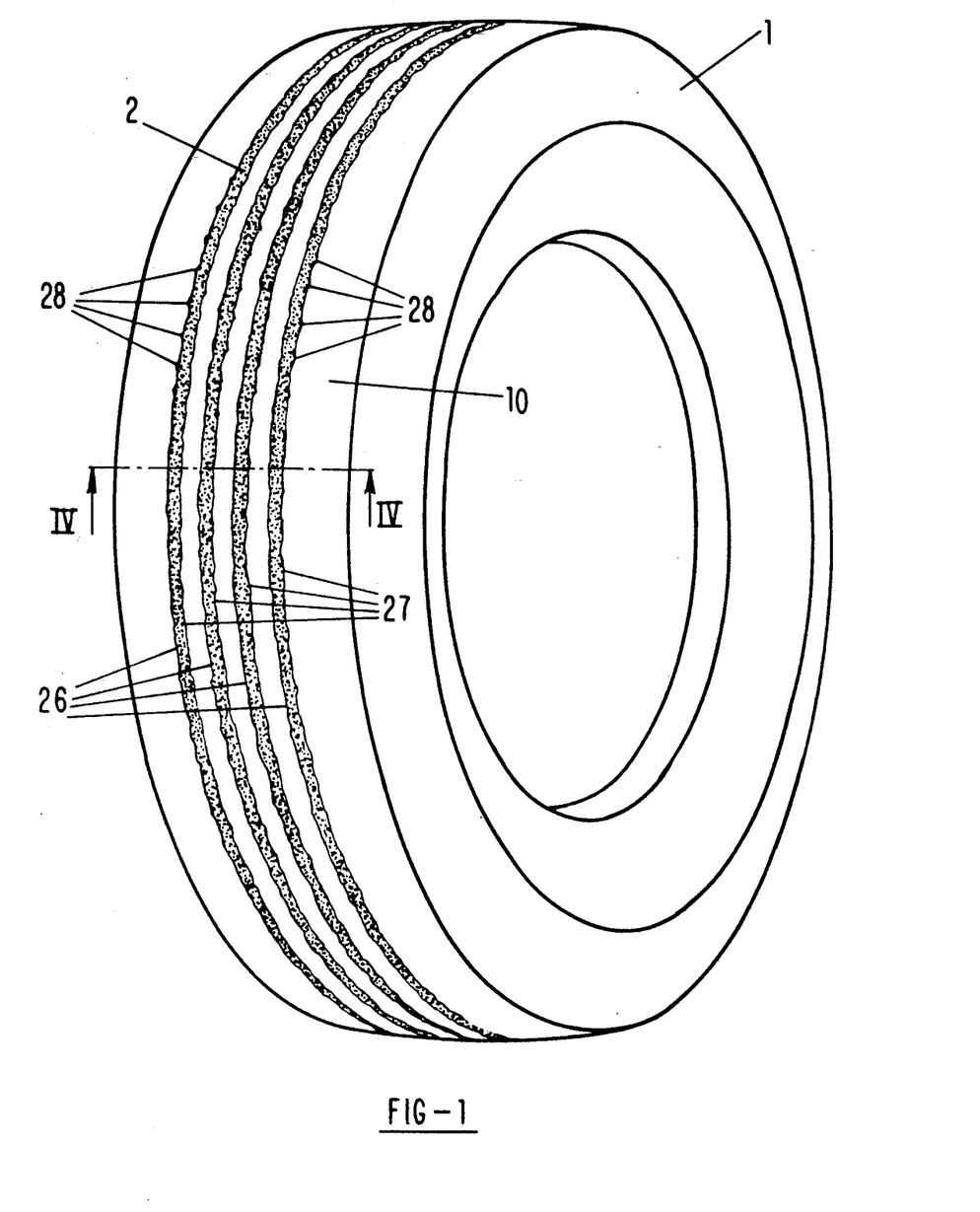
FIG. 1 is a perspective representation of an inventive pneumatic vehicle tire.

For the purpose of a general orientation, the representation of FIG. 1 shows the inventive pneumatic vehicle tire 1 with four circumferential grooves 2 in a perspective view. This tread design is especially suitable for non-driven axles of commercial vehicles such as trucks and trailers. The lamellas are not represented in this drawing. The circumferential grooves are indicated in black ink over their entire depth to indicate their appearance to a person looking onto the tire from a distance.

According to this representation, only the periphery 10 of the tire tread surface is visible. The left edges 26 and the right edges 27 of the circumferential grooves 2 are provided with staggered small recesses 28, but otherwise extend in a straight fashion in the circumferential direction. The presence of these recesses 28 corresponds to a preferred embodiment of the present invention.

The FIGS. 2 to 4 and 6 correspond to the same embodiment as represented in FIG. 1. The variant according to FIG. 5 has no effect on the tread groove appearance at the tire tread periphery so that this variant also falls under the schematic representation of FIG. 1.

Figure 2:
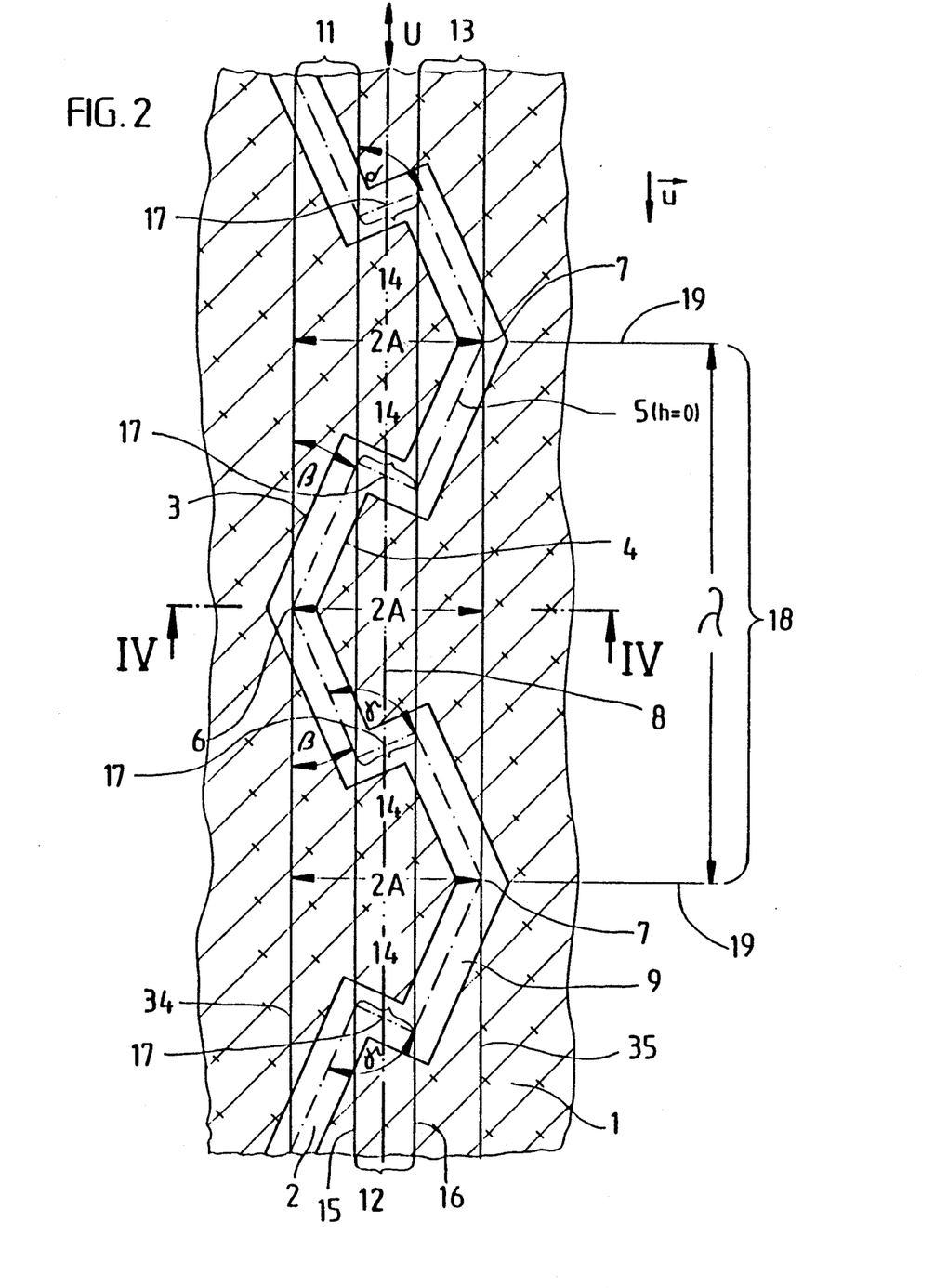
FIG. 2 shows a segment of the tread surface in a longitudinal sectional view taken in the vicinity of the bottom of the groove.

The true-to-scale representation of FIG. 2 shows in a sectional view in the circumferential direction U a portion of one circumferential groove 2 of an inventive pneumatic vehicle tire 1. The section is taken along the line II—II in FIG. 4. The section extends in the vicinity of the bottom 9 of the groove 2. The left groove side wall 3 is represented as a thick solid line, as is the right groove side wall 4. In the middle between the two side walls 3, 4, a thin dash-dotted line represents the groove center line 5. The points farthest to the left of the groove center line 5 are called left extremes 6. In analogy, the points to the farthest right are called right extremes 7. The extremes 6 and 7 in the represented embodiment are in the form of sharp bends. However, this is not a necessary requirement, it is also possible to provide the grooves of the present invention with extremes that exhibit a continuous bending.

Connecting the left extremes 6 exactly in the circumferential direction U, a thin solid line is shown which in the following is designated as the left border 34 of the left extreme section 11. Correspondingly, the right extremes 7 are connected by a thin solid line which represents the right border 35 of the right extreme section 13. In the center between the two borders 35 and 34 the center reference line 8 is located which is represented in a dash-dot-dot line. The central reference line 8 is used to determine the waveshape of the groove center line 5 of the groove 2.

Without taking into consideration the curvature of the tire in the circumferential direction, the wavelength is independent of the elevation of a chosen sectional view. However, the amplitude A of the groove center line 5 depends on the elevation of the chosen section such that, starting at the here chosen elevation of the section at the bottom of the groove, the amplitude A is reduced with increasing elevation of the section and with a reduced elevation of the section is constant. In a cross-sectional view according to FIG. 5 instead of FIG. 4, the amplitude A is increased with a reduced elevation of the section.

It is essential for the present invention that the axial space which is covered by the groove center line 5 may be divided into three sections, namely a left extreme section 11, a center section 12, and a right extreme section 13. The center section 12 is of special interest. It extends from its left border 15 to its right border 16 which both (15, 16) extend in the circumferential direction U. The left extreme section 11 extends from its left border 34 to the left border 15 of the center section 12. Accordingly, the right extreme section 13 extends from the right border 16 of the center section 12 to its right border 35.

In both extreme sections 11, 13, the circumferential grooves 2 are embodied in an essentially known manner, that is, with a periodically twisted cross-section, whereby the twisting axis extends in the circumferential direction U and is approximately at the elevation of the tire periphery.

The novelty of the tread design of the present invention lies within the center section 12. The center section 12 is provided with transverse portions 14. The transverse portions 14 extend essentially transverse to the circumferential direction U and approximately vertical to the further portions of the circumferential groove within the extreme sections 11 and 13. The length of the transverse portions 14 is reduced in the direction toward the periphery of the tire.

In the shown example, the axial distance between the left extreme section 11 and the right border 35 of the right extreme section 13 corresponds to 11 mm. This distance corresponds to twice the amplitude A. Thus, the amplitude A of the groove center line 5 in this example is 5.5 mm.

The axial distance of the borders 15 and 16 of the middle section 12 relative to one another is 3.3 mm in the shown example. Thus, with the central reference line 8 serving as a reference, the left border 15 of the center section 12 is at minus 1.65 mm and the right border 16 is at +1.65 mm. The center section thus extends, relative to the amplitude A, from −0.3 A to +0.3 A.

In a manner known per se, the pitch and thus the wavelength λ should vary according to a pitch sequence over the circumference of the inventive pneumatic vehicle tire 1 in order to reduce resonance peaks. According to the embodiment represented in FIGS. 1, 6 and 7, the corresponding pitch sequence is comprised of three different pitches of different lengths. It is possible that a pitch corresponds to a wavelength. However, it is also possible that a pitch is comprised of only one half wavelength or two wavelengths or a multiple of a half wavelength. The smaller the number of wavelengths per pitch is, the higher the number of pitches to be distributed over the given tire circumference must be. The selection of the length of the pitch does not influence the gist of the present invention. Within the scope of all of the embodiments of the present invention, it is presupposed that the length of a pitch 18 corresponds to exactly one wavelength λ. The pitch borders 19 extend through the right extremes 7.

The ratio of the longest pitch length to the shortest pitch length in the shown example is 1.22 to 1. FIG. 2 shows the bottom 9 of the groove 2 with the shortest one of the three pitch lengths according to a preferred embodiment. Due to the variation pitch lengths, a fluctuation of the angles results for an invariance of the borders 35, 15, 16 and 35: The angle β between the extreme sections 11 or 13 of the grooves center line 5 and the circumferential direction U for the shown shortest pitch length is 25° and for the longest pitch length is 21°.

The angle γ between a transverse portion 14 and the further portions of a subsequent extreme section 11 or 13 is 90° for the shown shortest pitch length and 81.3° for the longest pitch length.

The angle δ between a transverse portion 14 and a circumferential direction U is 65° for the shown shortest pitch length and 60.3° for the longest pitch length.

Independent of the variation of the pitch length the following equation is valid:

$$\beta + \delta = \gamma$$

The representation of FIG. 2 and of all the other Figures corresponds essentially to the subject matter of claim 16, the importance of which will be explained in the following with the aid of FIG. 2. The circumferential direction U provides for two orientations, a forward or backward orientation, respectively, concerning the present drawing FIG. 2, upward or downward. One orientation may be selected at random, and in the following the orientation from top to bottom will be viewed. Starting at a randomly selected point on the groove center line 5 which is located within the extreme sections 11 or 13, the groove center line 5 is followed in a downward direction of the orientation ū and it can be seen that for the transition from the extreme section 11 into the center section 12 such a great turn is necessary that the transverse portion 14 is now followed in an opposite circumferential orientation −ū. When leaving the center section 12, the original orientation ū is regained.

This preferred embodiment may be described in a simpler manner by stating that the angle δ is smaller than 90°. However, this definition is only clear after consulting the FIG. 2 in order to prevent misunderstanding with respect to which one of the two complimentary angles between the transverse portion 14 and the circumferential direction U is referred to.

All of the shown pitches 18 in FIG. 2 are of the same length. The intersection of the groove center line 5 with the central reference line 8 represent points of symmetry 17. This is also true for the superposition with a pitch sequence.

Figure 3:
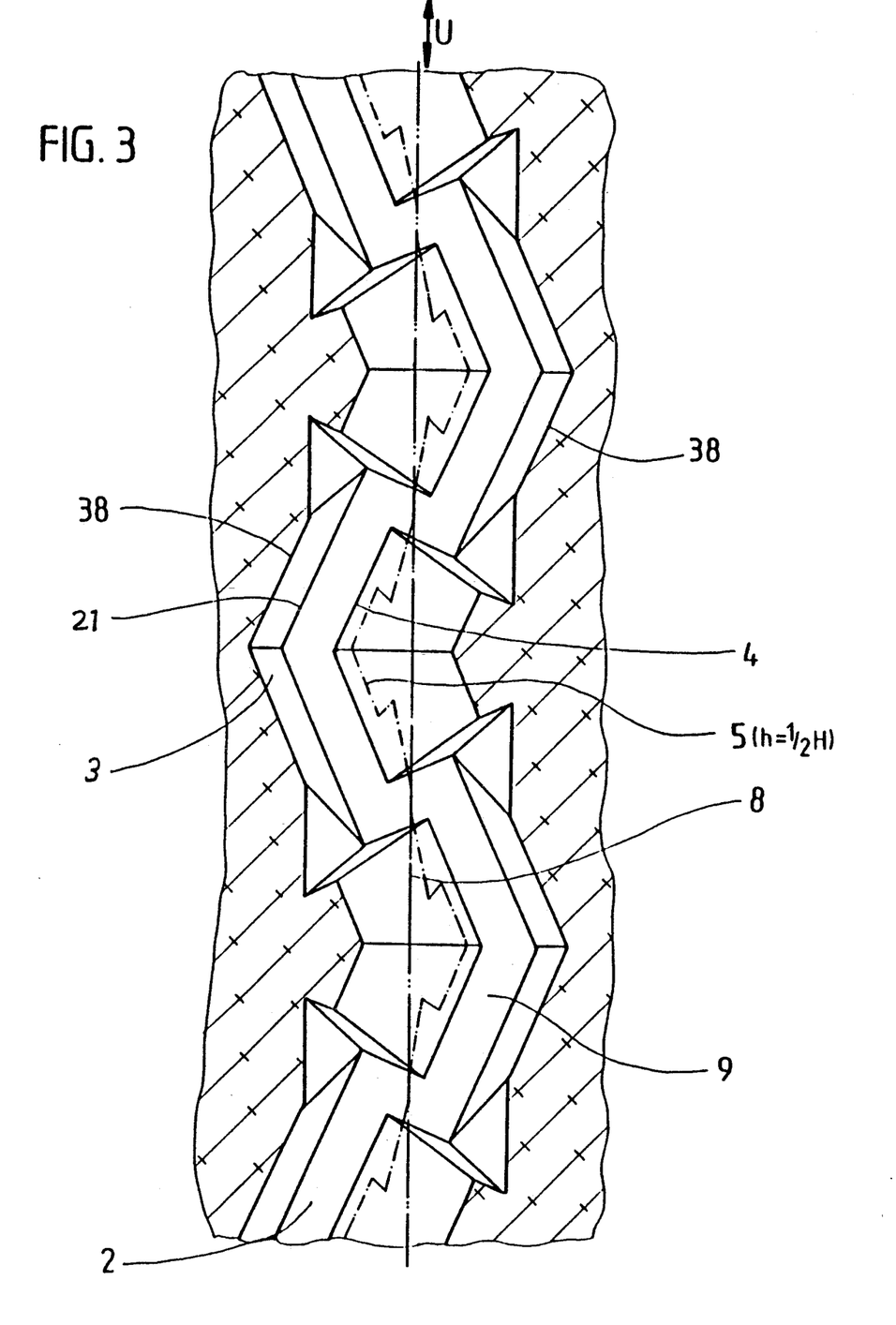
FIG. 3 is a longitudinal sectional view in analogy to FIG. 2, however, taken at half the height of the groove.

In FIG. 3 the same circumferential groove 2 as represented in FIG. 2 is shown in a part-sectional view in the circumferential direction U using the same scale. However, the elevation of the section has been selected to be at half the height of the groove. While in FIG. 2 the cutting edges of the sections correspond essentially to the contour of the bottom of the groove 2 with the recess 21, the cutting edges 38 in this view extend essentially along the groove side walls 3 and 4. In this representation the groove center line 5 at half the groove height is indicated in a dash-dotted line. For further details of the representation of FIG. 3 the reader is referred to the description of FIG. 2.

Figure 4:
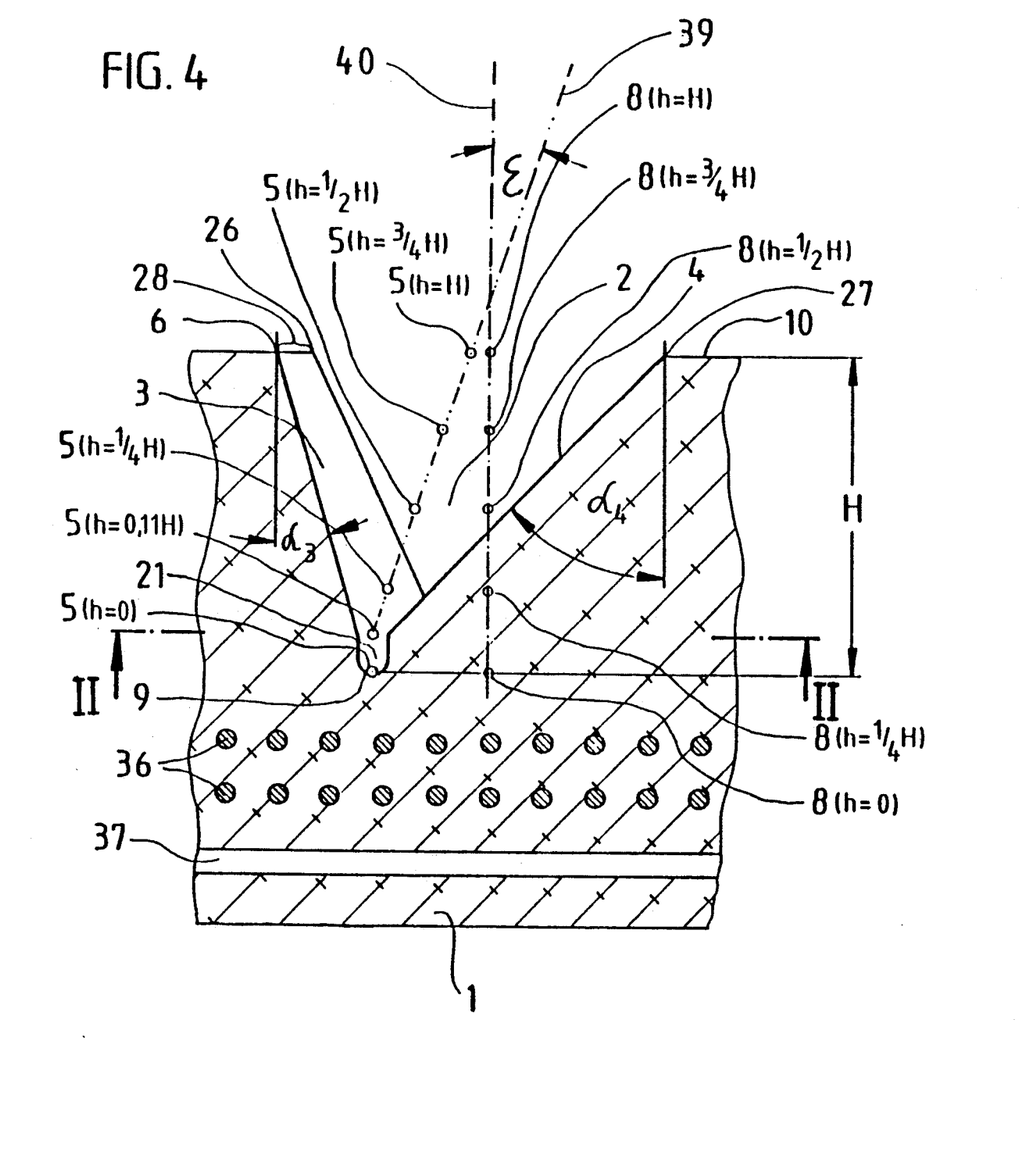
FIG. 4 shows a cross-sectional view of a longitudinal groove in a preferred embodiment with a recess at the bottom of the groove.

FIG. 4 is a true-to-scale representation according to the section taken along the line IV— IV of FIG. 2 and represents a cross-sectional view of the circumferential groove 2. The location of the cross-section has been chosen with respect to the circumferential direction such that it extends through a left extreme 6. In contrast to the right groove side wall 4, a portion of the left groove side wall 3 is thus shown as a plan view and the magnitude of the recess 28 is visible.

The representation of the angles of the groove side walls is the most important feature of FIG. 4. These angles are indicated by the reference sign α. The angle of the left groove sidewalls 3 is indicated at $\alpha_3$ and the angle of the right groove side wall 4 is indicated at $\alpha_4$. At the extremes 6, 7 the difference between the two angles $\alpha_3$ and $\alpha_4$ reaches its maximum.

In contrast to the center reference line 8, the groove center line 5 penetrates the cross-sectional plane at varying axial positions depending on the portion of the radial height H which is under consideration. In order to clarify this subject matter the intersections of both lines at varying heights between 0 and H are shown. A double-dash double-dotted line 39 connects the points of intersection 5(h) of the groove center line 5 as a straight line, whereby only the points of intersection 5 (h>0, 11H) radially outwardly of the recess 21 are considered. The points of intersection 8(h) of the central reference line 8 at various portions of the radial height are connected by a double dash-dotted line 40. In this embodiment the two connected lines 39 and 40 are straight lines. The angle ε between these two lines represents the magnitude of twisting and is in a close relationship to the amplitude at the bottom 9 of the groove 2. At the extremes, here at the chosen left extreme 6, the twisting is greatest.

For constructive considerations a groove cross-section with the here shown recess 21 at the bottom line of the groove 2 is preferred. With this measure especially great angles of the groove side walls are possible which results in a further reduction of the retention of stones.

The two reinforcement layers 36 and the radial carcass 37 which are indicated below the bottom 9 of the groove 2 are not a limiting factor of the invention. The inventive tread design is also suitable for different numbers of reinforcement layers 36 and layers of the radial carcass 37.

Figure 5:
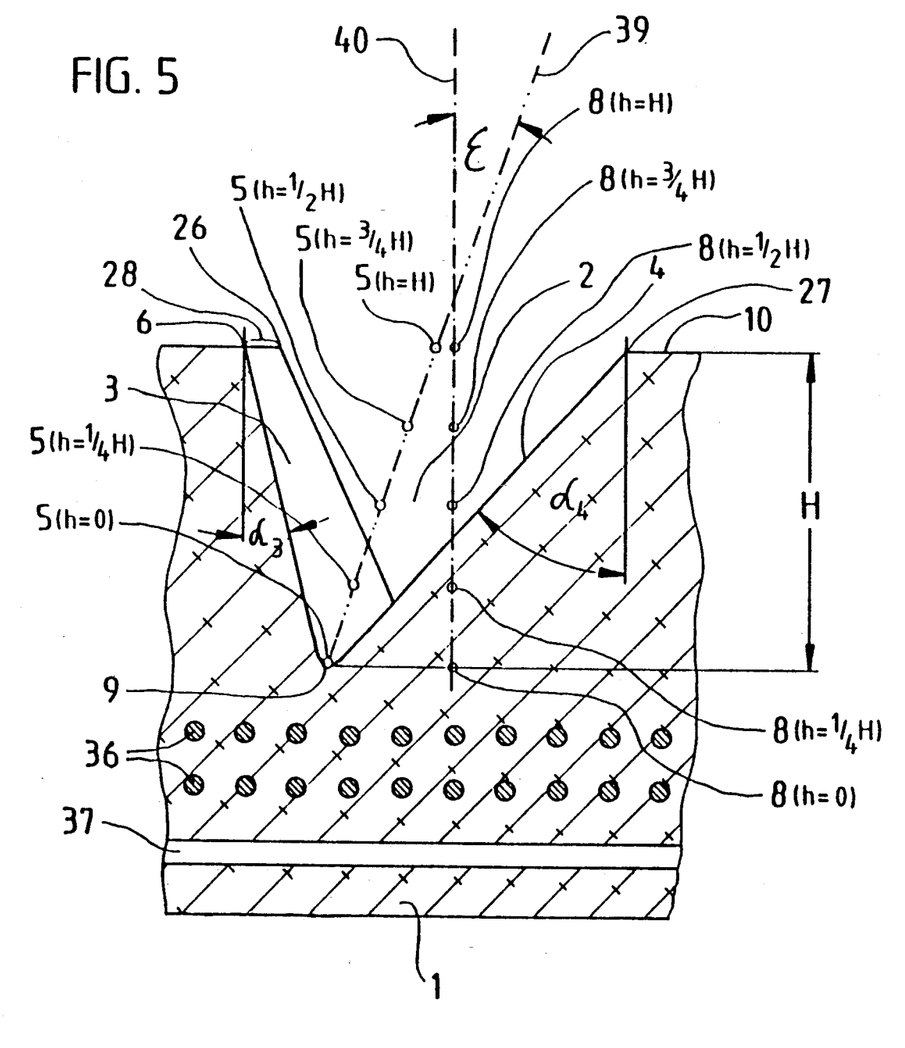
FIG. 5 is a view according to FIG. 4 of an inventively formed longitudinal groove without a recess at the bottom of the groove.

FIG. 5, in analogy to FIG. 4, shows a cross-section through a circumferential groove 2 without a recess at the bottom 9. This embodiment has the advantage that the vulcanizing mold for such a tire tread is easier to manufacture than for the constructively preferred embodiment according to FIG. 4. For further details of FIG. 5, reference is made to the description of FIG. 4.

Figure 6:
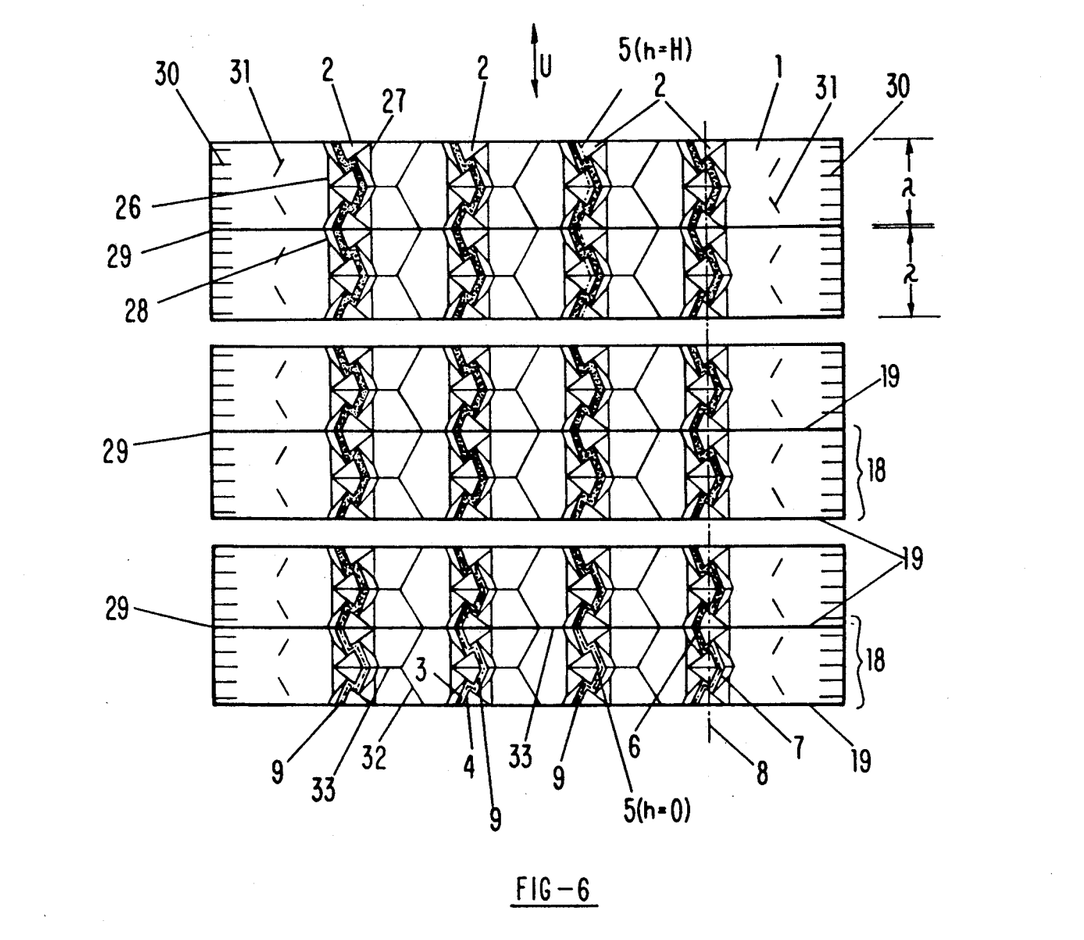
FIG. 6 shows as slotted representation of a detailed tire tread for commercial vehicles in which all four circumferential grooves extend parallel to one another.

FIG. 6 shows a tread of the inventive tire according to FIG. 1 in a detailed, true-to-scale slotted representation. The slotted representation of a tire is produced such that the part of the tread to be represented is developed and shown in a plan view. Since the tire tread is not exactly cylindrical, because the circumference of the tire at the shoulders is smaller than at the zenith, the developed projection may not be represented as a true-to-scale representation in the form of a homogenous rectangle. The length defect which is increasing toward the shoulder section is represented in so-called projection slots 29; thus, the designation "slotted representation". After each individual wavelength λ one projection slot 29 is shown. Of the three pitches 18 of different lengths always two identical ones are represented adjacently for the purpose of a facilitated understanding of the groove design at the pitch borders 19 which coincide with the borders of the projection slot 29.

At the top, two short pitches 18 are shown. At the center, two pitches 18 of medium length are represented, and at the bottom, two long pitches 18 are shown. After the addition of a pitch sequence, the tread design is thus represented in a detailed fashion. The space between the three pairs of pitches serves only to facilitate the graphic representation.

The tread surface of a pneumatic vehicle tire 1 as represented in FIG. 6 is provided with four circumferential grooves 2. The four circumferential grooves 2 are identical so that the features for one individual circumferential groove 2 corresponds to the features of the other circumferential grooves 2. The left groove edges 26 and the right groove edges 27 as well as the recesses 28 are located at the periphery of the tire tread. Since the inventive circumferential groove design may only be understood as a three-dimensional design, it is preferable to consult also FIGS. 4 or 5 which, corresponding to the line IV—IV of FIG. 1 extending vertically to the circumferential direction in a radial direction, shows one of four circumferential grooves 2 in a cross-sectional view.

According to FIG. 6, the tire tread periphery is provided with lamellae. Lamella 30 as shown at the edges. Lamellae 31 are provided at the shoulders and between the circumferential grooves 2 further lamellae are shown which in the following will be designated as circumferential lamellae 32. The circumferential lamellae 32 form a waveshape having the same wavelength as the circumferential groove 2. The intermediate lamellae 33, which extend essentially in an axial direction, ex-&end from the respective extreme of the circumferential lamellae 32 toward the neighboring circumferential groove 2. In order to prevent a misinterpretation of the double line of the projection slots 29 as further axial intermediate lamellae, the projection slot 29 between the two lower pitches 18 and between the two centrally located circumferential groove 2 is represented in a broken line.

The aforementioned lamellae cooperate favorably with the embodiment of the circumferential groove 2. This will be discussed in the following.

In the two bottom pitches 18 of FIG. 6 the bottom 9 of the left circumferential groove 2 is shown in solid black. To facilitate the description of the meander-like extensions of the circumferential groove 2, a groove center line 5 is defined as a function of the respective portion of the height h. For the two bottom pitches the groove center line 5 for the three further circumferential groove 2 is indicated at the height h=0. In order to simplify the drawing, the central reference line 8 is only shown for the right circumferential groove 2.

For the circumferential groove 2 second to the right in FIG. 6, the extension of the groove center line 5 is shown at the height h=H, i.e., at the periphery, for the two top pitches. The representation of the groove center line 5 at the height h=0.5 H may be taken from FIG. 3, a representation at an enlarged scale. Due to the complicated contour of the groove center line 5 (h =0.5 H) the representation in the present scale is impossible.

FIG. 6 shows a pneumatic vehicle tire in which all of the four circumferential grooves 2 are parallel to one another. This means that for any chosen section in the circumferential direction U equidistantly to the tire periphery the resulting cutting edges of the groove side walls 3 and 4 of one groove 2 are parallel to the corresponding cutting edges of the three other grooves. In other words, the respective elevational lines are always equidistant to one another whereby the distance must be measured in the axial direction. The advantage of parallel circumferential grooves lies in the fact that the circumferential grooves may be placed closely next to one another in the axial direction. For accomplishing a sufficiently smooth ride, the tread may not be designed with too coarse a pattern. It is especially expedient when the average wavelength corresponds to 1/7 of the length of the contact surface area under normal load.

Figure 7:
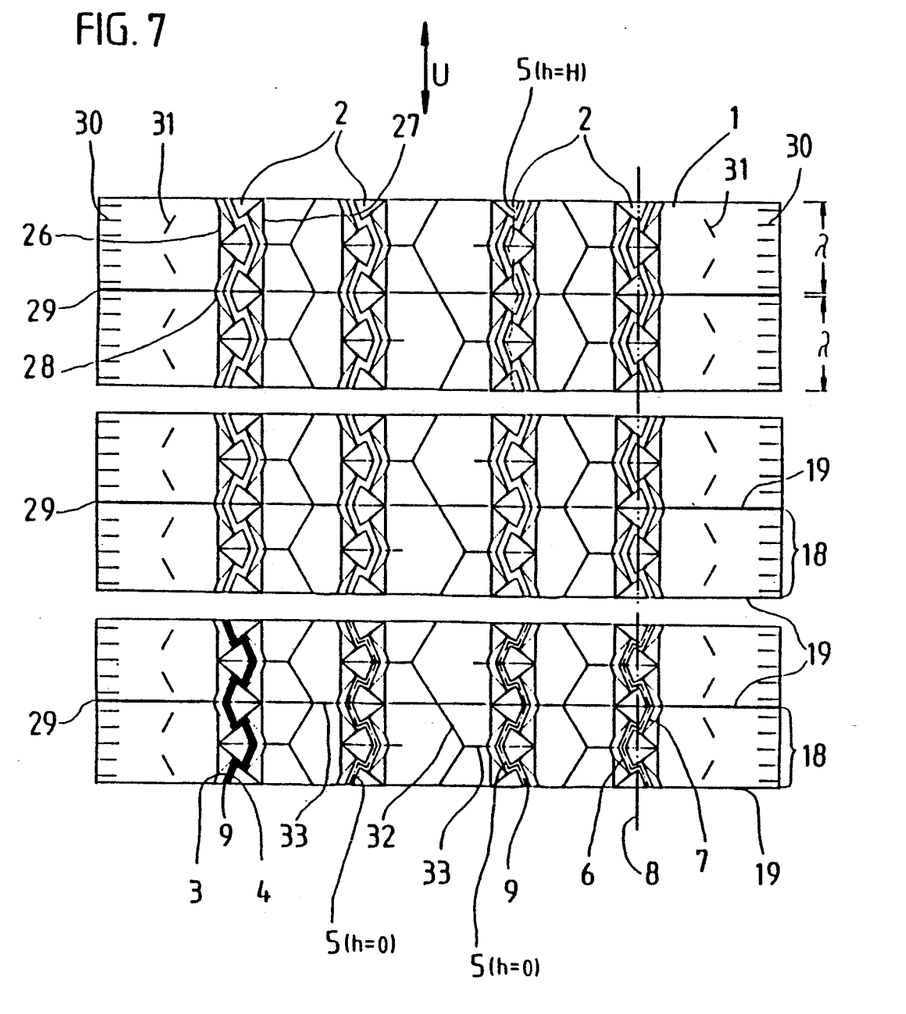
FIG. 7 is a view according to FIG. 6 (a slotted representation of a further detailed tire tread for commercial vehicles), having four circumferential grooves which are however arranged in pairs having an axis of symmetry.

FIG. 7 shows a tire which is similar to the one represented in FIG. 6 The essential difference is that in FIG. 7 the circumferential grooves are arranged in pairs which are symmetrical with respect to a centrally extending axis. The circumferential groove to the extreme left is axially symmetrical to the groove at the far right and the circumferential groove 2 immediately adjacent to the central radial plane of the tire is axially symmetric to the circumferential groove immediately adjacent to the radial center plane. The two circumferential grooves 2 in the left half of the drawing are parallel to one another as are the two circumferential grooves in the right half of the drawing.

Of course, it is also possible to provide an embodiment in which between the two left and between the two right circumferential grooves a symmetry axis is provided However, since two neighboring circumferential grooves which are axially symmetrical to one another require a greater distance from one another than two parallel circumferential grooves, the density of the circumferential groove, that is the number of grooves per width of the tire tread, would be decreased. Thus, it is preferred that only one single symmetry axis is provided at the center of the tire tread.

For further details of FIG. 7 reference is made to the analog features of FIG. 6.

Figure 8:
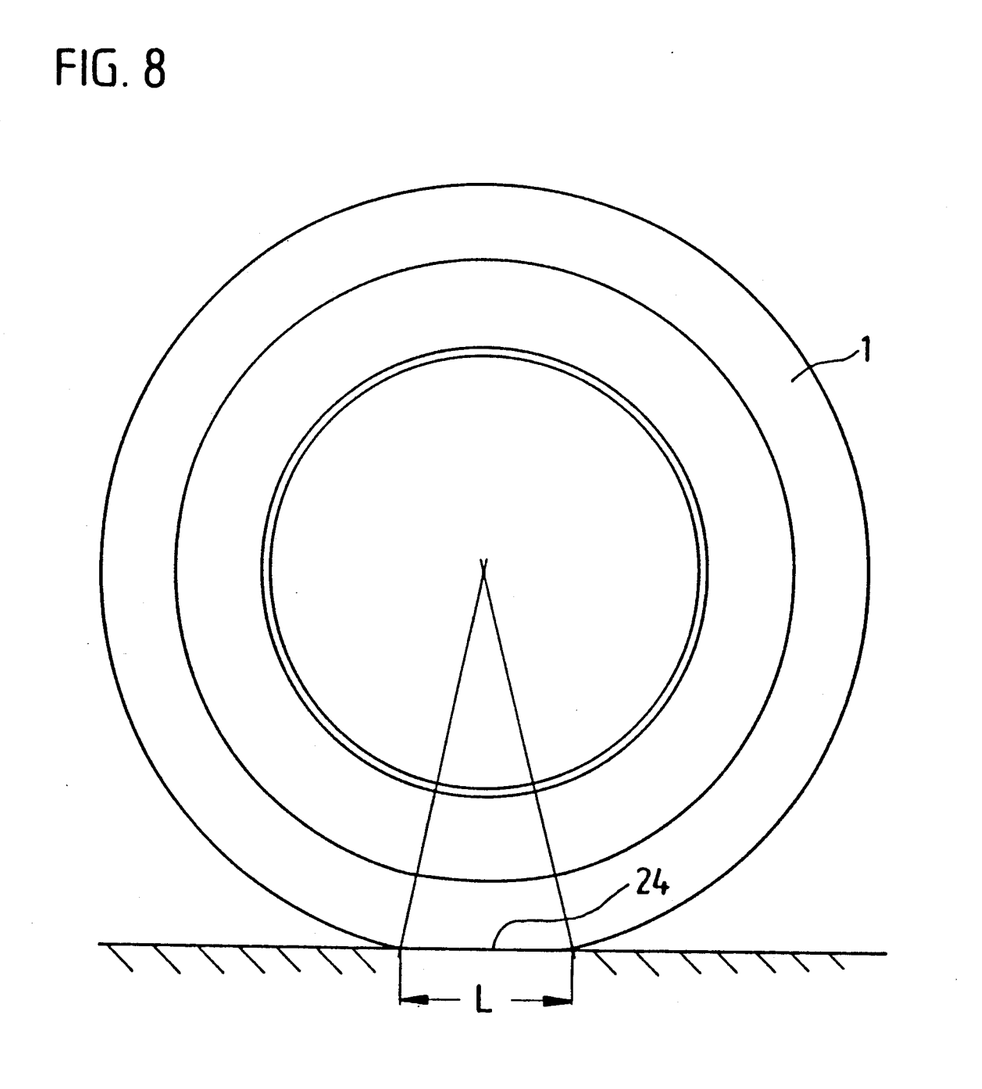
FIG. 8 shows a pneumatic vehicle tire of the present invention in a side view.

In FIG. 8, a pneumatic vehicle tire 1 is shown in its operational state in a side view, whereby the wheel rim has been omitted to facilitate the understanding of the drawing. The FIG. 8 serves only to illustrate the surface contact area 24 and its length L which is used as a reference for the preferred determination of the wavelength in correspondence to the claims 12 and 13.

The present invention is, of course, in no way restricted to the specific disclosure of the specification and drawings, but also encompasses any modifications within the scope of the appended claims.

What we claim is:

1. A pneumatic vehicle tire for commercial vehicles with a tire tread, said tread comprising:

wave-shaped circumferential grooves with a right and a left groove side wall and a bottom, said grooves having right and left extremes relative to a circumferential direction of said grooves, each of said grooves having a groove center line defined equidistantly between said right and said left groove side walls at any portion of a radial height of said grooves;

a central reference line extending in a circumferential direction of said grooves, with an amplitude of said groove center line being measured from said central reference line at a respective portion of said radial height, said amplitude of said groove center line being greater at said bottom of said grooves than at a periphery of said tread, with said amplitude increasing continuously from said periphery to said bottom of said groove;

said grooves being divided into three axially adjacent sections, a left extreme section, a center section that is symmetrically arranged relative to said central reference line, and a right extreme section, with said groove center line passing in a periodically repeated sequence from said left extreme section through said center section to said right extreme section, and from there back through said center section to said left extreme section, and so on;

said groove center line in said center section below the tread periphery having an essentially transverse portion relative to said circumferential direction and in said left and said right extreme sections having further portions extending at a small acute angle relative to said circumferential direction; and wherein said transverse portion is oppositely oriented with respect to said circumferential direction relative to said further portions in said left and said right extreme sections.

2. A pneumatic vehicle tire according to claim 1, wherein, at said bottom of said groove, said transverse portion encloses an angle of 75° to 105° with said further portions of said left and right extreme sections.

3. A pneumatic vehicle tire according to claim 1, wherein, at said bottom of said groove, said transverse portion forms an angle at least 60° with said circumferential direction.

4. A pneumatic vehicle tire according to claim 3, wherein said angle is between 60° and 70°.

5. A pneumatic vehicle tire according to claim 1, wherein said small acute angle is smaller than 35°.

6. A pneumatic vehicle tire according to claim 1, wherein an axial extension of said center section relative to said central reference line corresponds to at least 0.2 to at most 0.4 times a value of said amplitude of said grove center line at said bottom of said groove, said center section being symmetrical relative to said central reference line, and with said transverse portion extending over an entire axial length of said center section.

7. A pneumatic vehicle tire according to claim 1, wherein said grooves form pairs such that said grooves of a respective one of said pairs are symmetrically arranged with respect to an axis of symmetry extending in said circumferential direction so that at any selected position in said circumferential direction each one of said left extremes of a first one of said grooves of said respective pair corresponds to a respective one of said right extremes of the second groove of said pair.

8. A pneumatic vehicle tire according to claim 7, wherein said pairs are comprised of neighboring ones of said grooves, said grooves being spaced at least 2.6 times said height of said grooves from one another.

9. A pneumatic vehicle tire according to claim 1, wherein neighboring ones of said grooves are arranged parallel to one another and spaced at least 2.2 times said height of said grooves from one another.

10. A pneumatic vehicle tire according to claim 9, wherein said neighboring said grooves are spaced at most 2.6 times said height of said grooves from one another.

11. A pneumatic vehicle tire according to claim 1, wherein two of said grooves adjacent to a radial center plane of said tire are symmetrically arranged with respect to an axis of symmetry extending in said circumferential direction so that at any selected position in said circumferential direction each one of said left extremes of a first one of said grooves corresponds to a respective one of said right extremes of the second groove, and wherein neighboring ones of said grooves extending from said radial center plane to shoulders of said tread have an axial distance between respective ones of said reference lines of at least 2.2 times said height of said grooves, said neighboring grooves being parallel to one another, and with the axial distance between said two grooves adjacent to said radial center plane being greater than the axial distance between said neighboring grooves.

12. A pneumatic vehicle tire according to claim 11, wherein a greatest wave length of said grooves adjacent to said radial center plane is at most ⅓ and at least 1/7 of a length of a surface contact area of said tire under normal load.

13. A pneumatic vehicle tire according to claim 1, wherein all of said grooves are parallel to one another, with a greatest wave length of said parallel grooves being at most 1/5 and at least 1/9 of a length of a surface contact area of said tire under normal load.

14. A pneumatic vehicle tire according to claim 1, wherein said amplitude at said bottom of said grooves is at least 40% of a width of said grooves at said periphery of said tread.

15. A pneumatic vehicle tire according to claim 1, wherein said amplitude at said periphery of said tread is at most 10% of a width of said grooves at said periphery of said tread.

16. A pneumatic vehicle tire according to claim 1, said tread has a pitch sequence with uniform pitch length, and a developed projection of said grooves at any portion of said height exhibits radial symmetry, with points of symmetry being positioned on said central reference line and on said transverse portion.

17. A pneumatic vehicle tire according to claim 1, wherein said tread is comprised of 60 to 110 pitches of varying circumferential length forming a pitch sequence, with said pitches being formed of a single pattern, with axial dimensions of said pitches being invariant and circumferential dimensions being varied according to said pitch sequence, and wherein a developed projection of said grooves at any portion of said height exhibits radial symmetry, with points of symmetry being positioned on said central reference line and on said transverse portion.

18. A pneumatic vehicle tire according to claim 1, wherein said tread is comprised of 60 to 110 pitches of varying circumferential length forming a periodic pitch sequence, with said pitches being formed of a two alternating patterns, with axial dimensions of said pitches being invariant and circumferential dimensions being varied according to said pitch sequence, and wherein a developed projection of said grooves at any portion of said height exhibits radial symmetry, with points of symmetry being positioned on said central reference line and on said transverse portion.

19. A pneumatic vehicle tire according to claim 1, wherein said bottom of said grooves has a recess having a radial height between 1.5 to 2.2 mm and an axial width between 2 to 3 mm.

* * * * *